US008362824B2

(12) United States Patent
Wong et al.

(10) Patent No.: US 8,362,824 B2
(45) Date of Patent: Jan. 29, 2013

(54) EXPONENTIAL VOLTAGE CONVERSION SWITCHED CAPACITOR CHARGE PUMP

(75) Inventors: Oi Ying Wong, Hong Kong (CN); Wing Shan Tam, Hong Kong (CN); Chi Wah Kok, Hong Kong (CN)

(73) Assignee: Canaan Microelectronics Corporation Limited, Hong Kong (CN)

( * ) Notice: Subject to any disclaimer, the term of this patent is extended or adjusted under 35 U.S.C. 154(b) by 70 days.

(21) Appl. No.: 12/969,192

(22) Filed: Dec. 15, 2010

(65) Prior Publication Data
US 2011/0285455 A1    Nov. 24, 2011

Related U.S. Application Data

(60) Provisional application No. 61/345,679, filed on May 18, 2010.

(51) Int. Cl.
G05F 1/10          (2006.01)
(52) U.S. Cl. ........................................................ 327/536
(58) Field of Classification Search .................. None
See application file for complete search history.

(56) References Cited

U.S. PATENT DOCUMENTS 5,436,587 A *   7/1995  Cernea ........................... 327/536
2008/0266916 A1* 10/2008  Yen et al. ......................... 363/74

OTHER PUBLICATIONS

Ying, et al. Area-Efficient CMOS Charge Pumps for LCD Drivers. IEEE Journal of Solid State Circuits, vol. 38, No. 10, Oct. 2003. Last accessed Mar. 21, 2011, 5 pages.
Dickson. On-Chip High-Voltage Generation in MNOS Integrated Circuits Using an Improved Voltage Multiplier Technique. IEEE Journal of Solid-State Circuits, vol. SC-11, No. 3, pp. 374-378, Jun. 1976. Last accessed Mar. 21, 2011, 5 pages.
Moisiadis, et al. "A CMOS Charge Pump for Low Voltage Operation," ISCAS 2000—IEEE International Symposium on Circuits and Systems, May 28-31, 2000, Geneva, Switzerland. Last accessed Mar. 21, 2011, 4 pages.
Richelli, et al. A 1.2V-5V High Efficiency CMOS Charge Pump for Non-Volatile Memories. IEEE International Symposium on Circuits and Systems, pp. 2411-2414, 2007. Last accessed Mar. 21, 2011, 4 pages.
Wang, et al. Efficiency Improvement in Charge Pump Circuits. IEEE Journal of Solid State Circuits, vol. 32, No. 6, Jun. 1997. Last accessed Mar. 21, 2011, 9 pages.
Zhang, et al. Integrated Multivalue Voltage-to-Voltage Converter. IEEE International Conference on Electronics, Circuits and Systems, pp. 335-338, 1999. Last accessed Mar. 21, 2011, 4 pages.
Nakagome, et al. An Experimental 1.5-V 64-Mb DRAM. IEEE Journal of Solid State Circuits, vol. 26, No. 4, Apr. 1991. Last accessed Mar. 21, 2011, 8 pages.
Oota, et al. Analysis of Switched-Capacitor Transformer with a Large Voltage-Transformer-Ratio and its Applications. Electronics and Communications in Japan, Pt.2, vol. 73, No. 1, pp. 85-96, 1990.

* cited by examiner

*Primary Examiner* — Lincoln Donovan
*Assistant Examiner* — Sibin Chen
(74) *Attorney, Agent, or Firm* — Turocy & Watson, LLP

(57) ABSTRACT

Described herein are switched capacitor charge pump designs for a $2^n \times$ voltage converter. The $2^n \times$ voltage converter is constructed by cascading n units of substantially identical unit cells, which are respectively composed of cross-coupled single cell doubler circuits. Dynamic inverters are used to completely activate and deactivate the power switches in the respective unit cells to increase area efficiency. The charge pump designs described herein are implemented with standard high-voltage CMOS processes without requiring MOSFET transistors with different threshold voltages, giving the charge pump a regular structure that simplifies design and layout and reduces production costs. In addition, techniques for constructing a charge pump according to the designs provided herein are described.

26 Claims, 14 Drawing Sheets

EXPONENTIAL VOLTAGE CONVERSION SWITCHED CAPACITOR CHARGE PUMP

CROSS-REFERENCE TO RELATED APPLICATIONS

This application claims priority to U.S. Provisional Patent Application Ser. No. 61/345,679, filed on May 18, 2010, and entitled EXPONENTIAL VOLTAGE CONVERSION SWITCHED CAPACITOR CHARGE PUMP, the entirety of which is hereby incorporated by reference.

TECHNICAL FIELD

This disclosure relates generally to charge pump circuits and, more specifically to techniques for low-cost, area efficient switched capacitor charge pump circuit design.

BACKGROUND

High electric fields are desirable in various electronic applications, such as flash memory, liquid crystal display (LCD) drivers, and the like. Conventionally, direct current-(DC) DC conversion methods that have been utilized to obtain high electric fields include the switched capacitor DC-DC converter, which has been shown to demonstrate properties suitable for on-chip implementation. Additionally, some existing switched capacitor charge pumps with high voltage gain are constructed via cascading voltage doublers. However, these existing cascading switched capacitor charge pump designs suffer from reverse current, body effect issues, and other factors negatively impacting performance.

Various techniques have been implemented in conventional charge pump circuits to mitigate these shortcomings. For example, a cross-coupled switched capacitor voltage doubler can be utilized to increase efficiency and voltage gain. Further, the voltage doubler can be cascaded without the output stage to realize a simplified 4× voltage converter. However, in these conventional charge pump designs, the threshold voltages of the switching transistors have to be precisely trimmed in order to prevent the reverse current problem. Accordingly, such designs require the use of expensive complementary metal-oxide-semiconductor (CMOS) processes to fabricate power transistors with two different threshold voltages, which can then be applied to implement the 4× voltage converter. While a small number of such CMOS processes exist, difficulty still persists in trimming the CMOS process for multiple threshold voltages for higher conversion ratios. In particular, it can be appreciated that the higher the conversion ratio desired, the larger the threshold voltages of the power transistors are required to be in the conventional charge pump designs described above. Accordingly, if the required threshold voltages become too large, the charge pump becomes difficult to manufacture. In addition, large threshold voltage requirements can potentially result in latch-up problems, which in turn render realization of a high voltage conversion ratio using conventional charge pump circuits substantially impossible.

In view of at least the above-described shortcomings of traditional charge pump circuits, it would be desirable to implement a charge pump circuit design that allows for high area efficiency and voltage conversion ratios.

SUMMARY

The following presents a simplified summary of various aspects of the disclosed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed subject matter in a simplified form as a prelude to the more detailed description that is presented later.

Various aspects described herein relate to an exponential (e.g., $2^n$) voltage converter based on an area efficient switched capacitor charge pump. The voltage converter is constructed by cascading n units of identical cells with a cross-coupled charge pump in order to provide level shifting to drive the switching transistors. The charge pump designs provided herein can be implemented using standard high-voltage CMOS processes, thereby mitigating the shortcomings of traditional charge pump designs as noted above.

In an embodiment, a cascaded voltage doubler circuit for $2^n \times$ conversion is described herein. The circuit makes use of dynamic inverters to completely activate and deactivate the power switches in the respective voltage doublers, resulting in an area-efficient switched capacitor charge pump. Further, a charge pump circuit as described herein can utilize the same number of power transistors and capacitors as that used in conventional charge pumps and can be implemented with standard high-voltage CMOS processes without requiring metal-oxide-semiconductor field effect transistor (MOSFET) with different threshold voltages. As a result, the charge pump circuit described herein has a regular structure, which simplifies the design and layout, and can be effectively cascaded to generate a high output voltage using standard high voltage CMOS processes.

The following description and the annexed drawings set forth in detail certain illustrative aspects of the disclosed subject matter. These aspects are indicative, however, of but a few of the various ways in which the principles of the disclosed subject matter may be employed. The disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
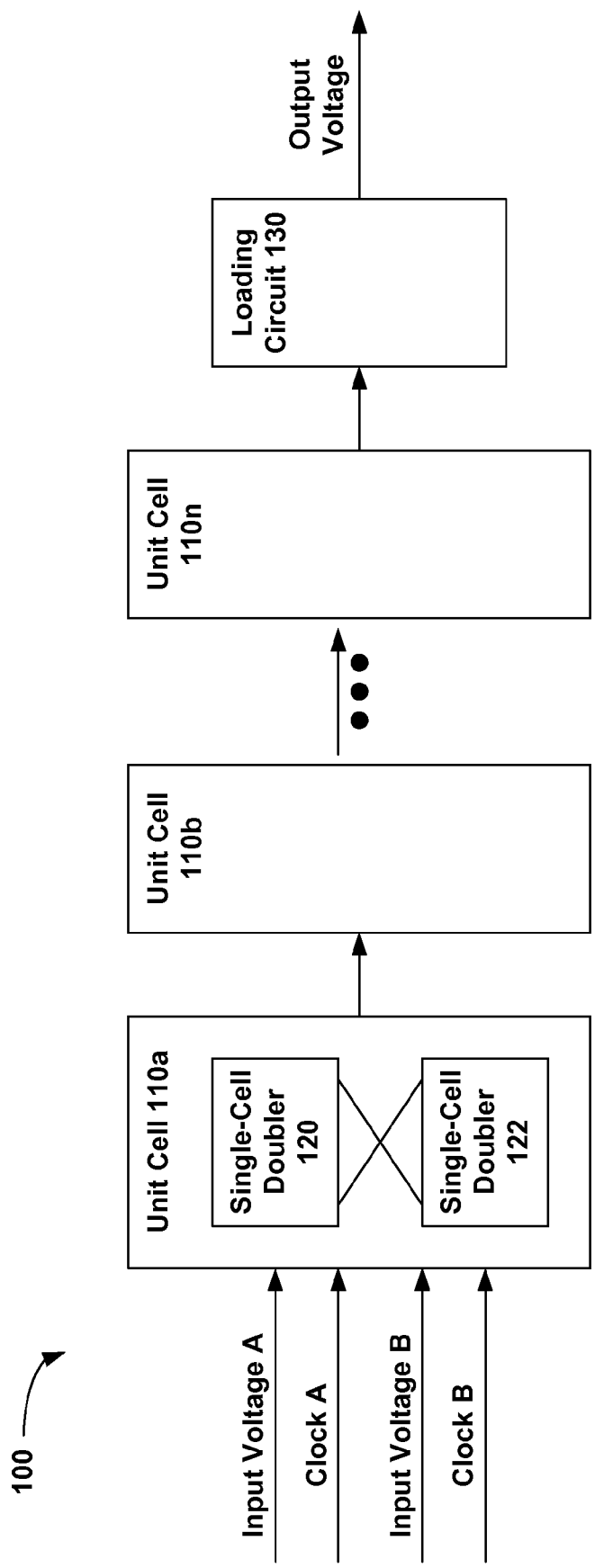
FIG. 1 is a block diagram of an exponential voltage conversion switched capacitor charge pump system in accordance with various aspects described herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

In addition, the terms "example," "exemplary," and/or "demonstrative" are utilized herein to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

Referring now to the drawings, FIG. 1 is a block diagram of an exponential voltage conversion switched capacitor charge pump system 100 in accordance with various aspects described herein. In one example, system 100 can be utilized to transform a set of two input voltages, denoted in FIG. 1 as input voltage A and input voltage B, to an output voltage signal that can in turn be utilized in various high voltage applications. As shown in FIG. 1, system 100 can include a set of unit cells 110a-110n that are operable to transform a set of two input voltage signals into respective output voltage signals based on corresponding clock signals as generally described herein. In an aspect, the input voltage signals and clock signals can be transformed via two cross-coupled single-cell doublers 120 and 122, which can be constructed to be similar or identical in structure. By way of example, single-cell doubler 120 at unit cell 110a can primarily operate on input voltage A and clock signal A while single-cell doubler 122 can primarily operate on input voltage B and clock signal B.

While system 100 illustrates two input voltage signals and two clock signals provided to unit cell 110a, it can be appreciated that inputs can be provided to unit cell(s) 110 in any suitable manner. For example, a single, common input voltage signal can be provided to unit cell 110a in place of two distinct input voltage signals. In another example, complementary clock signals can be provided to unit cell 110a by generating a single clock signal and providing the clock signal as well as an inverted form of the clock signal to unit cell 110a. Further, while unit cells 110a-110n are connected by single arrows in FIG. 1 for simplicity of illustration, it can be appreciated that unit cells 110a-110n can communicate any suitable number of signals between each other. Accordingly, for example, unit cell 110b can be provided with two input signals and two clock signals from the output of unit cell 110a, and so on. Correspondingly, output voltage signals from a final stage unit cell 110n can be provided to a loading circuit 130 which can operate as generally described herein to obtain a single output signal of system 100.

In an aspect, unit cells 110a-110n within system 100, as well as the respective single-cell doublers 120-122 within unit cells 110a-110n, are constructed with substantially similar or identical structures, thereby simplifying the design of system 100 and increasing area efficiency. Further, unlike conventional charge pump systems which require transistors exhibiting multiple threshold voltages and/or other expensive components, unit cells 110a-110n and the single-cell doublers 120-122 within them are structured as described herein using only transistors that can be fabricated using standard CMOS processes (e.g., and that operate according to respective singular threshold voltages), thereby significantly reducing the cost of system 100 with minimal tradeoffs in performance. Various circuit structures that can be utilized for unit cells 110a-110n and single-cell doublers 120-122 in this manner are described in further detail herein.

In an embodiment, a charge pump as described herein includes one or more uniform unit cells, which respectively include two cross-coupled single-cell doubler circuits respectively comprising a flying capacitor, one or more power transistors coupled to the flying capacitor, and a CMOS dynamic inverter coupled to the flying capacitor and at least one of the power transistors. The cross-coupled single cell doubler circuits are configured to operate on respective input voltage signals according to respective clock signals to produce respective output voltage signals, and the one or more power transistors of the two cross-coupled single-cell doubler circuits operate according to respective singular threshold voltages. The charge pump further includes a loading circuit configured to operate on respective output voltages of the one or more uniform unit cells to generate an output voltage of the charge pump. In one example, the one or more power transistors of the two cross-coupled single-cell doubler circuits are constructed according to at least one of a n-well CMOS process or a p-well CMOS process.

In some implementations, two cross-coupled single-cell doubler circuits respectively further include a first power transistor and a second power transistor structured such that a clock signal is provided to respective gates of the first power transistor and the second power transistor, an input signal from a complementary single-cell doubler circuit is provided to a source of the first power transistor, and respective drains of the first power transistor and the second power transistor are coupled to a negative terminal of the flying capacitor. The two cross-coupled single-cell doubler circuits can additionally include a third power transistor structured such that a drain of the third power transistor is coupled to a positive terminal of the flying capacitor and an input signal of the single-cell doubler circuit is provided to a source of the third power transistor. Further, the two cross-coupled single-cell doubler circuits can respectively include a dynamic inverter formed from at least first inverter transistor and a second inverter transistor, wherein the input signal of the single-cell doubler circuit is provided to respective gates of the first inverter transistor and the second inverter transistor, respective drains of the first inverter transistor and the second inverter transistor are coupled to a gate of the third power transistor, the input signal from the complementary single-cell doubler circuit is provided to a source of the first inverter transistor, and a source of the second inverter transistor is coupled to the positive terminal of the flying capacitor.

In other implementations of the above, the two cross-coupled single-cell doubler circuits can also include a clock signal output terminal coupled to the respective drains of the first power transistor and the second power transistor and a voltage signal output terminal coupled to the positive terminal of the flying capacitor. The clock signals and input signals of the two cross-coupled single-cell doubler circuits can oscillate between a high state and a low state. In such a case, a single-cell doubler circuit of the two cross-coupled single-cell doubler circuits can be configured to activate the second power transistor and deactivate the first power transistor in response to the clock signal of the single-cell doubler circuit operating in the high state, thereby causing the clock signal output terminal to output a signal operating in the low state. Further, the single-cell doubler circuit of the two cross-coupled single-cell doubler circuits can be configured to activate the first inverter transistor, deactivate the second inverter transistor, and activate the third power transistor in response to the input signal of the single-cell doubler circuit operating in the high state, thereby charging the flying capacitor and causing the voltage signal output terminal to output a signal with a voltage equal to the input signal.

Additionally or alternatively, a single-cell doubler circuit of the two cross-coupled single-cell doubler circuits can be configured to activate the first power transistor and deactivate the second power transistor in response to the clock signal of the single-cell doubler circuit operating in the low state, thereby charging the flying capacitor and causing the clock signal output terminal to output a signal operating in the high state. In addition, the single-cell doubler circuit of the two cross-coupled single-cell doubler circuits can be configured to deactivate the first inverter transistor, activate the second inverter transistor, and deactivate the third power transistor in response to the input signal of the single-cell doubler circuit operating in the low state, thereby causing the voltage signal output terminal to output an output signal higher than the input signal.

In other implementations of the above, the second power transistor and the first inverter transistor in the respective single-cell doubler circuits are n-channel metal-oxide-semiconductor (NMOS) transistors. Additionally or alternatively, the first power transistor, the third power transistor, and the second inverter transistor in the respective single-cell doubler circuits are p-channel metal-oxide-semiconductor (PMOS) transistors. In such an implementation, respective substrates of the PMOS transistors, constructed by doped wells on the silicon substrate, can be connected to respective nodes of highest potential of the PMOS transistors between respective sources of the PMOS transistors and respective drains of the PMOS transistors.

In a further implementation, a clock signal provided to a first single-cell doubler circuit of the two cross-coupled single-cell doubler circuits is complementary to a clock signal provided to a second single-cell doubler circuit of the two cross-coupled single-cell doubler circuits. In another implementation, a common input voltage signal is provided to the two cross-coupled single-cell doubler circuits of an initial unit cell. In still other implementations, the one or more power transistors of the two cross-coupled single-cell doubler circuits are configured with approximately equal threshold voltages.

In another embodiment, a method for constructing a charge pump as described herein includes constructing a single-cell doubler circuit at least in part by coupling a flying capacitor to one or more power transistors and coupling a CMOS dynamic inverter to the flying capacitor and at least one power transistor of the one or more power transistors, wherein respective power transistors of the one or more power transistors operate according to respective threshold voltages based on a one-to-one mapping between the one or more power transistors and the respective threshold voltages; constructing at least one voltage level shifting unit cell at least in part by cross-coupling at least one corresponding pair of single-cell doubler circuits; coupling the at least one voltage level shifting unit cell in a cascaded manner; and coupling a loading circuit comprising a loading resistor and a loading capacitor to the at least one voltage level shifting unit cell.

In an example, the above method further includes constructing the one or more power transistors according to a n-well CMOS process or a p-well CMOS process. In another example, construction of a single-cell doubler circuit in the above method can include connecting a clock signal source to respective gate inputs of a first power transistor and a second power transistor; connecting an input signal corresponding to a complementary single-cell doubler circuit to a source input of the first power transistor; coupling respective drain inputs of the first power transistor and the second power transistor to a negative terminal of the flying capacitor; coupling a positive terminal of the flying capacitor to a drain input of a third power transistor; connecting an input signal for the single-cell doubler circuit to a source input of the third power transistor; and constructing the CMOS dynamic inverter from a first inverter transistor and a second inventor transistor at least in part by connecting the input signal for the single-cell doubler circuit to respective gate inputs of the first inverter transistor and the second inverter transistor, coupling respective drain inputs of the first inverter transistor and the second inverter transistor to a gate input of the third power transistor, connecting the input signal corresponding to the complementary single-cell doubler circuit to a source input of the first inverter transistor, and coupling a source input of the second inverter transistor to the positive terminal of the flying capacitor.

In some implementations of the above, the single-cell doubler circuit can be configured to activate the second power transistor corresponding to the single-cell doubler circuit and to deactivate the first power transistor corresponding to the single-cell doubler circuit in response to a high state of a clock signal for the single-cell doubler circuit, thereby causing the single-cell doubler circuit to output a clock signal in a low state. Additionally or alternatively, the single-cell doubler circuit can be configured to activate the first inverter transistor corresponding to the single-cell doubler circuit, deactivate the second inverter transistor corresponding to the single-cell doubler circuit, and activate the third power transistor corresponding to the single-cell doubler circuit in response to a high state of an input voltage signal for the single-cell doubler circuit, thereby charging the flying capacitor and causing the single-cell doubler circuit to output an output signal equal to the input signal.

In other implementations, the single-cell doubler circuit can be configured to activate the first power transistor corresponding to the single-cell doubler circuit and to deactivate the second power transistor corresponding to the single-cell doubler circuit in response to a low state of a clock signal for the single-cell doubler circuit, thereby charging the flying capacitor and causing the single-cell doubler circuit to output a clock signal in a high state. Additionally or alternatively, the single-cell doubler circuit can be configured to deactivate the first inverter transistor corresponding to the single-cell doubler circuit, activate the second inverter transistor corresponding to the single-cell doubler circuit, and deactivate the third power transistor corresponding to the single-cell doubler circuit in response to a low state of an input voltage signal for the single-cell doubler circuit, thereby causing the single-cell doubler circuit to output an output signal with a voltage higher than the input signal.

In a further embodiment, a method for operating a charge pump as described herein includes supplying at least one input voltage signal and at least one clock signal to a voltage level shifting unit cell of at least one voltage level shifting unit cell coupled in cascade. The voltage level shifting unit cell includes at least one cross-coupled pair of corresponding single-cell doubler circuits, and the single-cell doubler circuits respectively include a flying capacitor coupled to one or more power transistors operating according to respective single threshold voltages and a CMOS dynamic inverter coupled to the flying capacitor and at least one power transistor of the one or more power transistors. The method further includes obtaining an output voltage signal from the at least one voltage level shifting unit cell in response to the at least one input voltage signal and the at least one clock signal.

In some implementations of the above, the method further includes obtaining a clock output signal in a low state from a single-cell doubler circuit of the cross-coupled pair of single-cell doubler circuits in response to supplying a clock signal in a high state to the single-cell doubler circuit of the cross-coupled pair of single-cell doubler circuits and obtaining an output voltage equal to that of the input signal from the single-cell doubler circuit of the cross-coupled pair of single-cell doubler circuits in response to supplying an input voltage signal in a high state to the single-cell doubler circuit of the cross-coupled pair of single-cell doubler circuits.

In other implementations of the above, the method further includes obtaining a clock output signal in a high state from a single-cell doubler circuit of the cross-coupled pair of single-cell doubler circuits in response to supplying a clock signal in a low state to the single-cell doubler circuit of the cross-coupled pair of single-cell doubler circuits and obtaining a level shifted output voltage signal from the single-cell doubler circuit of the cross-coupled pair of single-cell doubler circuits in response to supplying an input voltage signal in a low state to the single-cell doubler circuit of the cross-coupled pair of single-cell doubler circuits.

Yet another embodiment relates to a system including an input voltage source, one or more output devices, and a charge pump connecting the input voltage source to the one or more output devices that is configured to level shift the voltage of a signal corresponding to the input voltage source. The charge pump can include one or more uniform unit cells, which respectively can include two cross-coupled single-cell doubler circuits respectively comprising a flying capacitor, one or more power transistors coupled to the flying capacitor, and a CMOS dynamic inverter coupled to the flying capacitor and at least one power transistor of the one or more power transistors. The cross-coupled single cell doubler circuits can configured to operate on respective input voltage signals according to respective clock signals to produce respective output voltage signals. Additionally or alternatively, the one or more power transistors of the two cross-coupled single-cell doubler circuits operate according to respective solitary threshold voltages. The charge pump can further include a loading circuit configured to operate on respective output voltages of the one or more uniform unit cells to generate an output voltage of the charge pump.

In an example, the one or more output devices described above can include at least one of a liquid crystal display (LCD) driver, a memory device, a light-emitting diode (LED) driver, or a personal digital assistant (PDA).

In still another embodiment described herein, a voltage conversion system includes means for supplying an input voltage and at least one clock signal, means for converting the input voltage to a level shifted output voltage according to the at least one clock signal, and means for providing the level shifted output voltage to one or more output devices. In one example, the means for converting is implemented at least in part using power transistors having respective singular threshold voltages.

Figure 2:
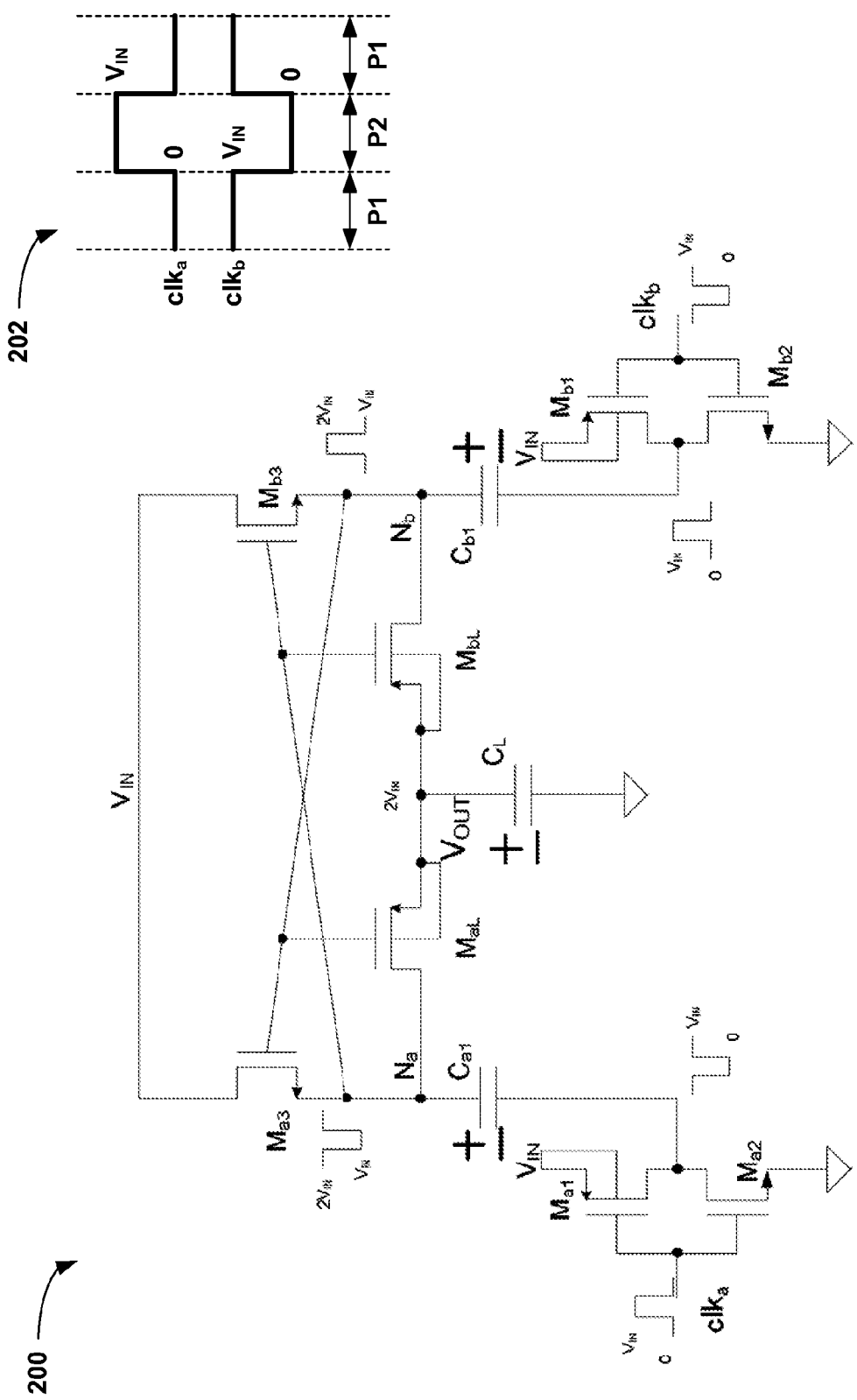
FIG. 2 illustrates an example cross-coupled voltage doubler.

Turning to FIG. 2, an existing proposed cross-coupled voltage doubler 200 (also referred to herein as a dual cell doubler) is illustrated. The voltage doubler 200 is formed by connecting two 2-phase voltage doublers (also referred to herein as single-cell doublers) to a common loading capacitor with complementary input clock signals, $clk_a$ and $clk_b$. Since the two single-cell doublers in each cross-coupled voltage doubler have the same structure, the following description focuses on the voltage doubler formed by $M_{a1}$, $M_{a2}$, $M_{a3}$, $M_{aL}$ and $C_{a1}$, which is driven by clock signal $clk_a$. The single-cell doubler is in a charging phase when $clk_a=V_{IN}$ (e.g., during the time interval P2) as shown in diagram 202. Additionally, the single-cell doubler is in a pumping phase during the time interval P1. During the charging phase, $M_{a2}$ and $M_{a3}$ are both turned on, while $M_{a1}$ and $M_{aL}$, are both turned off. Hence, capacitor $C_{a1}$ is charged by $V_{IN}$. During the pumping phase, $M_{a2}$ and $M_{a3}$ are both turned off, while $M_{a1}$ and $M_{aL}$ are both turned on. As a result, $V_{IN}$ will appear at the negative terminal of $C_{a1}$ (as denoted with respect to voltage doubler 200), and $2V_{IN}$ is obtained at $V_{OUT}$. The single-cell doubler driven by $clk_b$ operates in a similar manner at the opposite clock phase. As a result, a substantially constant $2V_{IN}$ appears at $V_{OUT}$. It can be appreciated that the clock signals utilized to activate or deactivate the power transistors in each single-cell doubler can be obtained by a single clock signal and its inverted counterpart such that no extra circuit is required to generate the high voltage clock signals.

Figure 3:
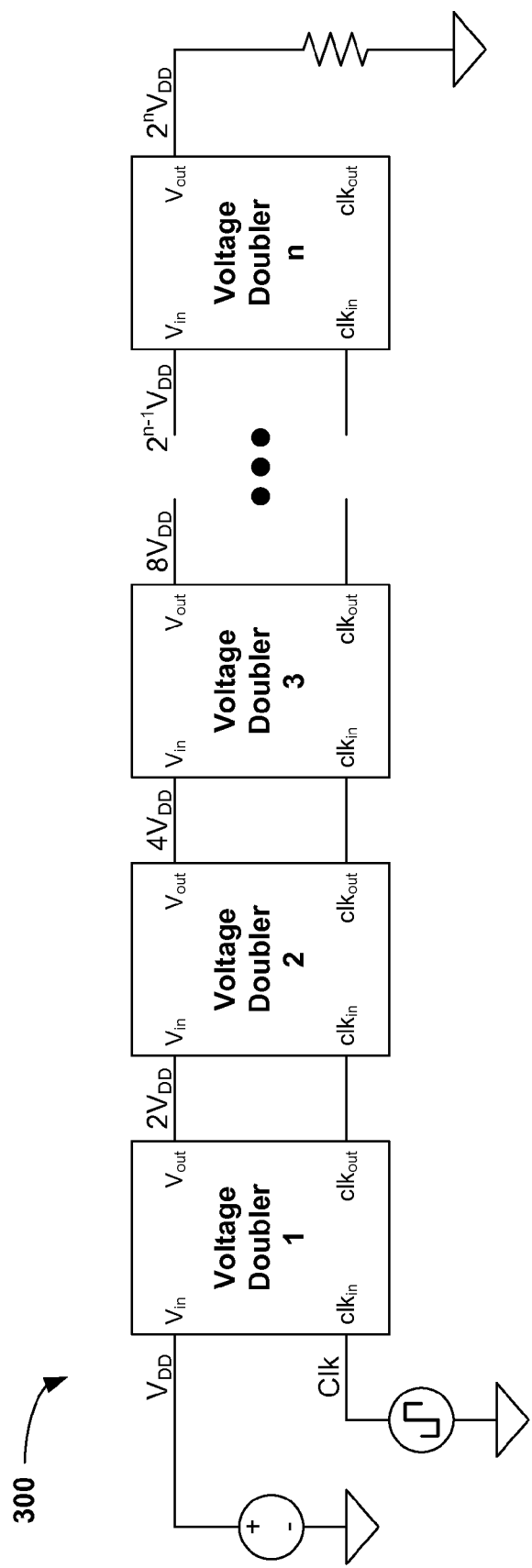
FIG. 3 illustrates an example charge pump constructed from cascaded voltage doublers.

The cross-coupled voltage doubler 200 illustrated by FIG. 2 can be cascaded to obtain a $2^n \times$ voltage conversion charge pump, as shown by charge pump 300 in FIG. 3. In another example, the number of transistors and capacitors in the charge pump can be further reduced by modifying the voltage doubler cell such that the complementary internal switching signals which swing between $V_{IN}$ and $2V_{IN}$ are utilized as the input voltages for the next cascaded cell, as shown by charge pump 400 in FIG. 4. By using the charge pump structure shown in FIG. 4, two PMOS power transistors and one loading capacitor can be saved for each cascaded stage when compared to that of charge pump 300 in FIG. 3. In one example, the charge pump 400 in FIG. 4 operates with the same 2-phase clock signal as that in FIG. 2.

Figure 4:
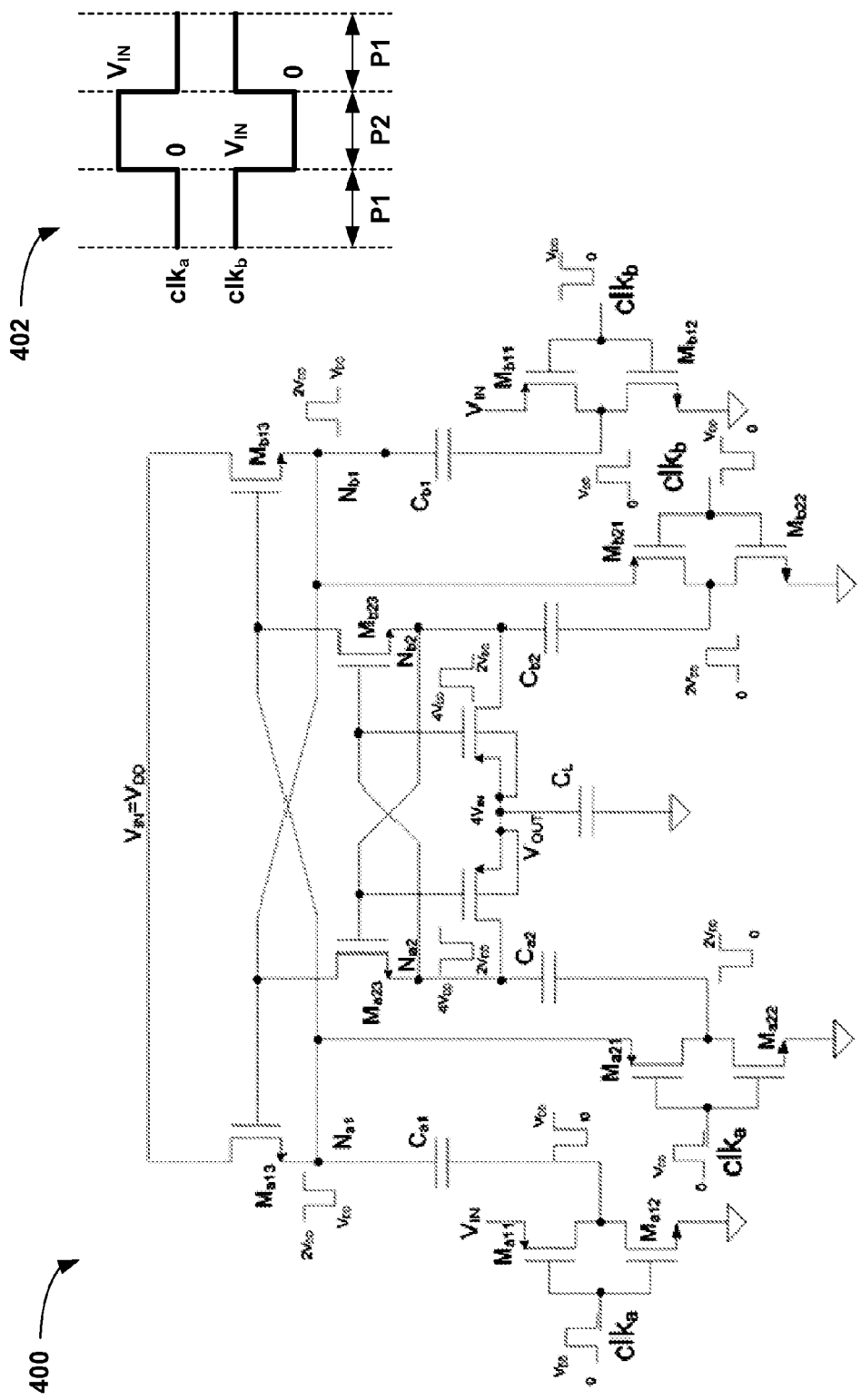
FIG. 4 illustrates an example 4× voltage conversion charge pump.

With further reference to charge pump 400 in FIG. 4, the single-cell doubler constructed with $M_{a21}$ $M_{a22}$, $M_{a23}$ and $C_{a2}$ can operate as follows. During the charging phase (e.g., during the time interval P2 as shown in diagram 402), $clk_a=V_{DD}$, $M_{a23}$ and $M_{a22}$ are both turned on, and $M_{a21}$ is turned off. $C_{a2}$ is charged by $2V_{DD}$ at node $N_{b1}$. During the pumping phase, $clk_a=0$ (e.g., during the time interval P1 as shown in diagram 402), $M_{a21}$ is turned on and both $M_{a23}$ and $M_{a22}$ are turned off. During this period, the negative terminal of $C_{a2}$ is pumped by $2V_{DD}$, and hence $4V_{DD}$ appears at node $N_{a2}$ during the pumping phase. In one example, the single-cell doubler constructed with $M_{b21}$, $M_{b22}$, $M_{b23}$ and $C_{b2}$ operates similarly at the opposite clock phase. As a result, $4V_{DD}$ appears at $V_{OUT}$ in both clock phases. In another example, a $2^n\times$ voltage conversion charge pump can be obtained by cascading ii cross-coupled cells in a similar manner to that shown by charge pump 400 for 4x voltage conversion.

However, with respect to charge pump 400, it can be appreciated that when $clk_a=0$, $M_{a23}$ must be turned off to prevent reverse current flowing from node $N_{a2}$ to node $N_{b1}$; otherwise, a reduction in the voltage gain, and hence the efficiency of the charge pump 400, will result. On the other hand, it can be appreciated that the drain, gate and source voltages of $M_{a23}$ (enumerated as $V_d(M_{a23})$, $V_g(M_{a23})$ and $V_s(M_{a23})$ respectively) are equal to $V_{DD}$, $2V_{DD}$ and $4V_{DD}$, respectively. As a result, a reverse current will flow from node $N_{a2}$ to node $N_{b1}$ unless the threshold voltage of the power transistor $M_{a23}$ is larger than $V_{DD}$. A similar issue also presents for $M_{b23}$. As more stages are cascaded, it can be appreciated that every newly cascaded stage will double the switching voltage levels at each node connected to the power transistors, when compared to that of the corresponding nodes in the previous stage. Therefore, the threshold voltage required by the n-th stage charge pump must be larger than $(2^{n-2})V_{DD}$ for $n\geq 2$. However, it is difficult and expensive to produce and/or otherwise obtain transistors with multiple threshold voltages which grow exponentially, and as a result, the availability of transistors with different threshold voltages limits the number of cascading stages that can be achieved with charge pump 400 and hence the highest achievable voltage. Moreover, transistors $M_{a13}$, $M_{b13}$, $M_{a23}$ and $M_{b23}$ will suffer from body effect problems unless a triple well process is used, which results in a further increase of the silicon area of the implemented circuit. Additionally, as large numbers of stages are cascaded, the body effect can result in a saturated output.

Figure 5:
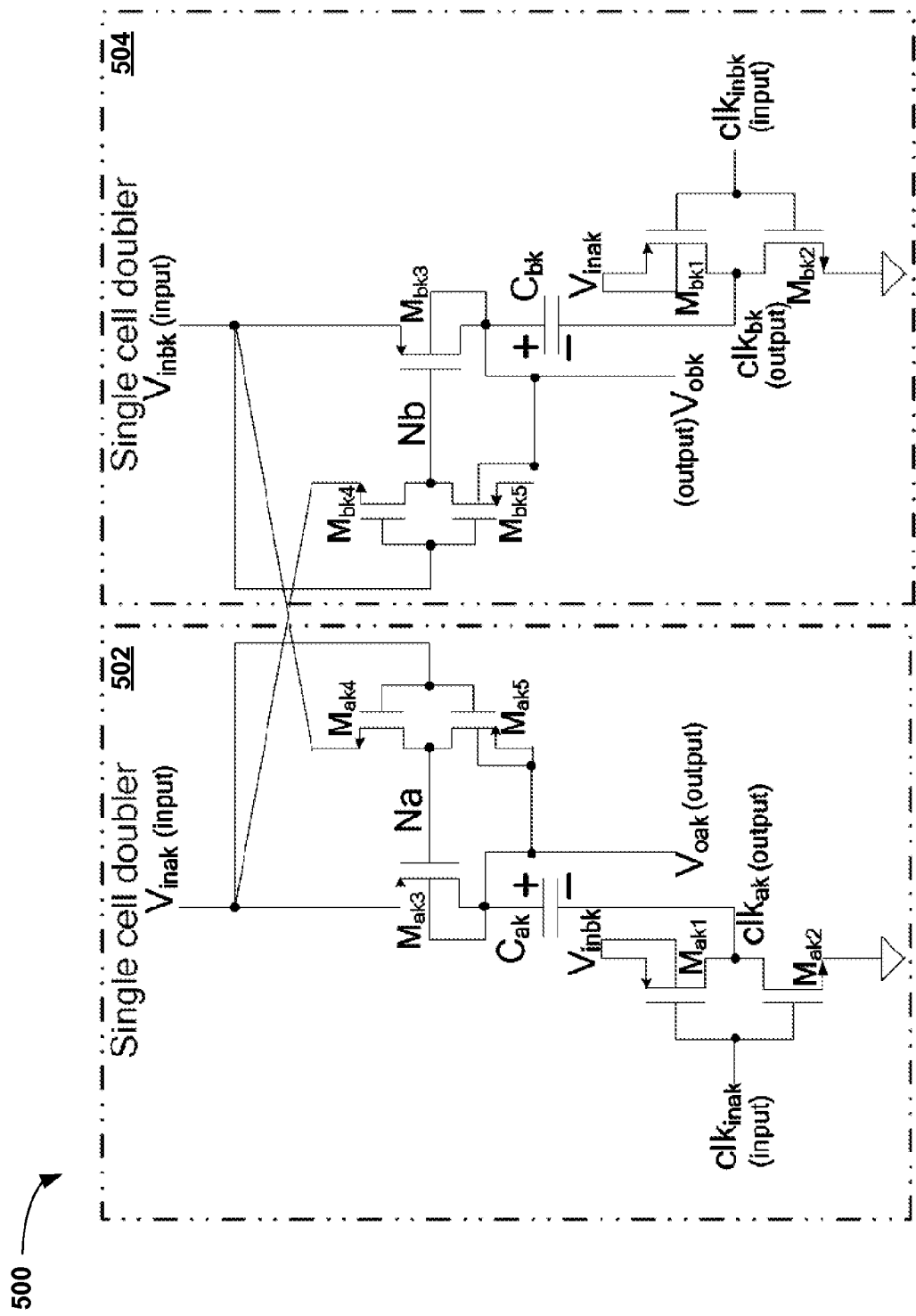
FIG. 5 illustrates an example unit cell for an exponential voltage conversion charge pump circuit in accordance with various aspects.

In view of at least the foregoing shortcomings of existing charge pump designs, a cross-coupled doubler cell can be implemented in accordance with various aspects herein that can be cascaded to achieve a $2^n\times$ voltage conversion charge pump without the reverse current problem noted above and without requiring MOSFETs with different threshold voltages. A circuit diagram of an example cross-coupled doubler cell 500 that can be implemented in accordance with various aspects is shown in FIG. 5. As illustrated in FIG. 5, $M_{ak1}$, $M_{ak2}$ and $M_{ak3}$ are the charge transfer power transistors in the single-cell doubler 502 on the left hand side of a k-th stage cross-coupled voltage doubler cell 500, and $C_{ak}$, $M_{ak4}$ and $M_{ak5}$ are the flying capacitor and transistors of a dynamic inverter, respectively. The transistors and capacitor of the single-cell doubler 504 on the right hand side of the k-th stage cross-coupled voltage doubler cell 500 are enumerated similarly with the subscript b instead of a.

Figure 6:
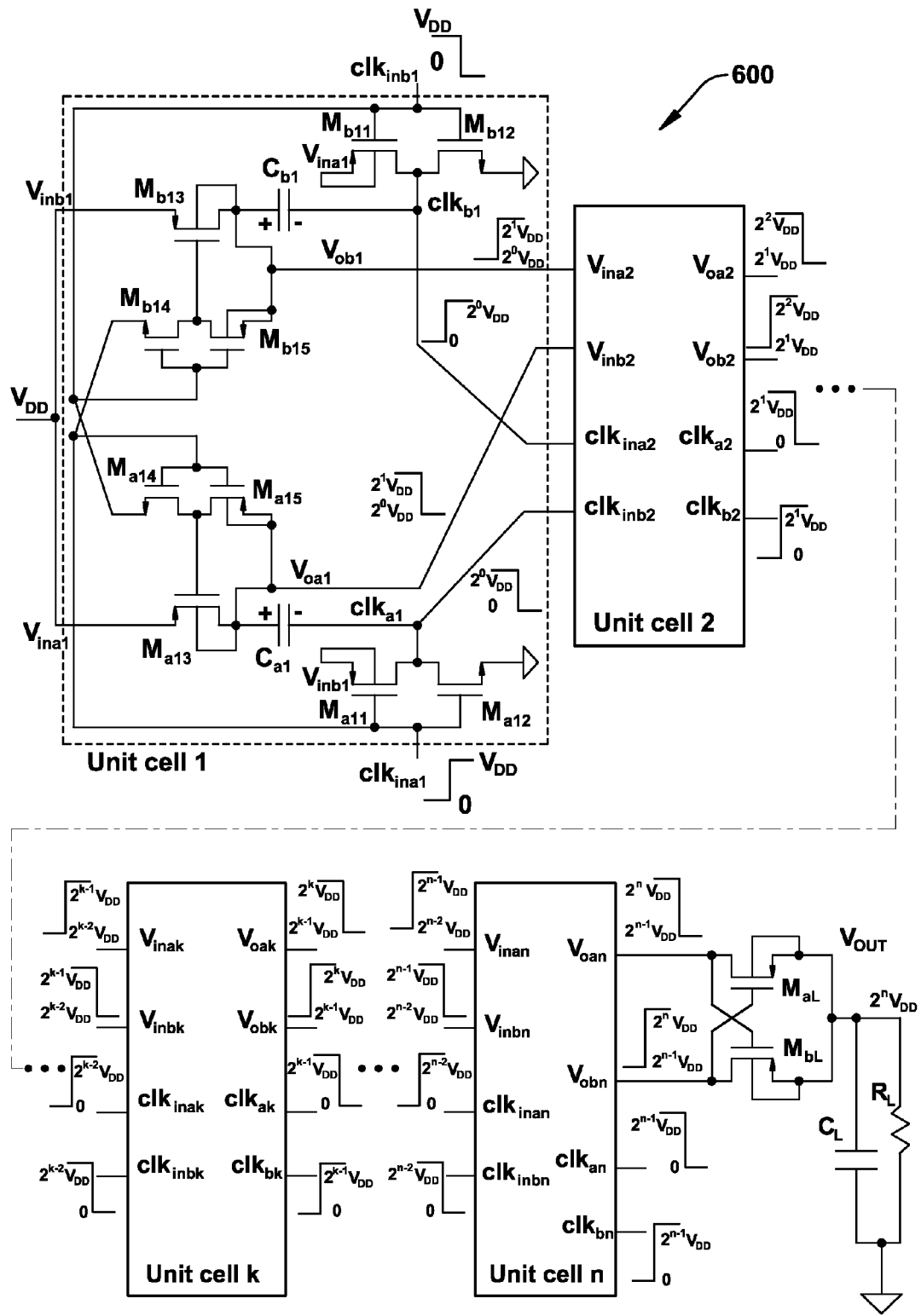
FIG. 6 illustrates a circuit diagram of an exponential voltage conversion charge pump circuit in accordance with various aspects.
Figure 7:
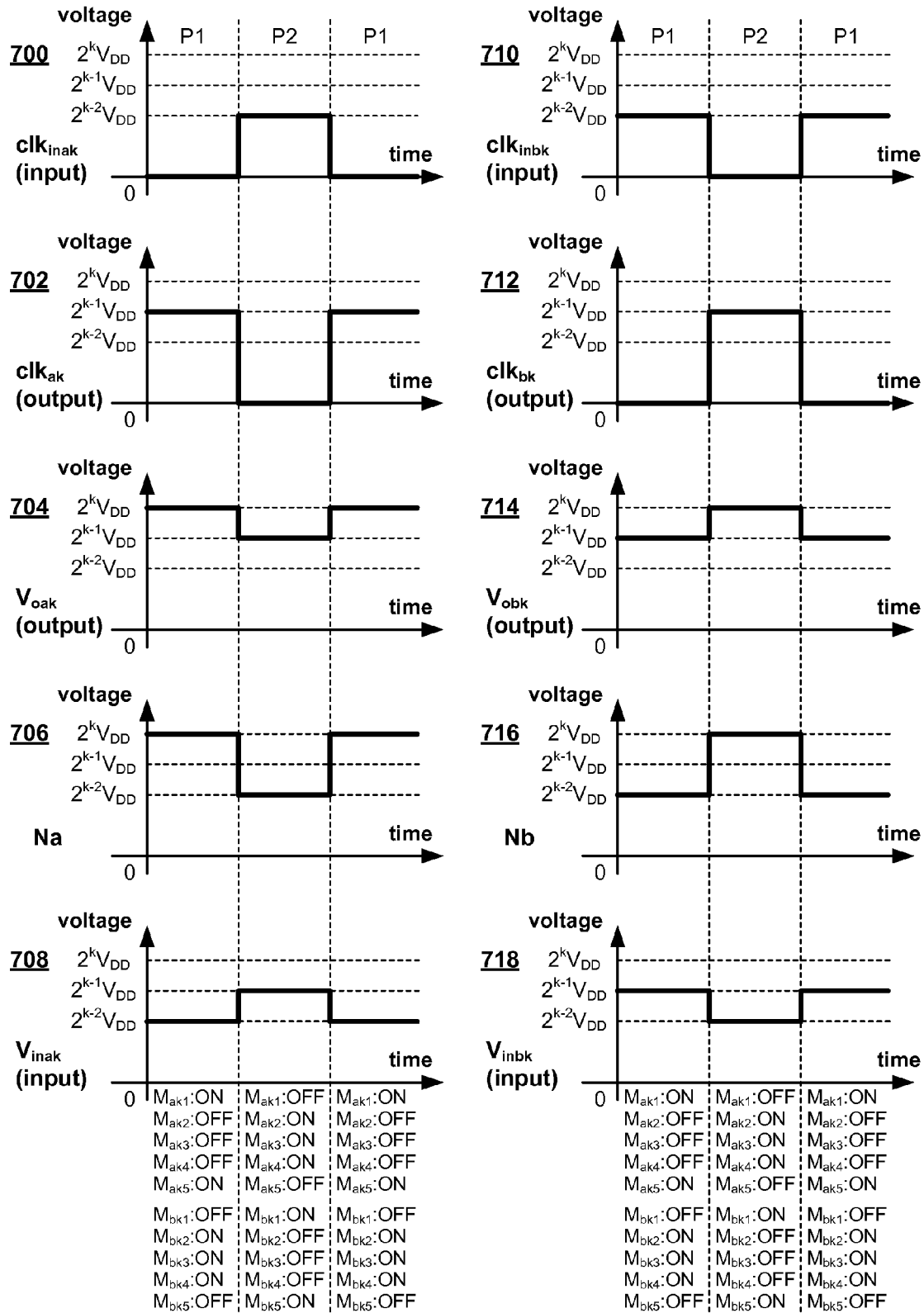
FIG. 7 illustrates operation of an example charge pump unit cell in accordance with various aspects.

In one example, a $2^n\times$ voltage converter based on a 2-phase charge pump can be constructed by cascading unit cell 500, as shown by charge pump circuit 600 in FIG. 6. The outputs of the last stage of charge pump 600 are connected to two PMOS power transistors ($M_{aL}$ and $M_{bL}$), which charge the loading capacitor $C_L$ in alternate phase. To prevent the reverse current problem and the body effect problem as described above, the cross-coupled doubler cell 500 illustrated by FIG. 5 connects the gate of the transistors $M_{a3}$ and $M_{b3}$ to the outputs of the dynamic inverters constructed by $M_{ak4}$, $M_{ak5}$ and $M_{bk4}$, $M_{bk5}$, respectively. As further shown in FIG. 5 and diagrams 700-718 in FIG. 7, the k-th stage unit cell (with $k\geq 2$) is driven by a pair of complementary clock signals from the previous stage with voltage swing $(2^{k-2}V_{DD}, 2^{k-1}V_{DD})$ at the inputs $V_{in\_ak}$ and $V_{in\_bk}$. Meanwhile, another pair of complementary clock signals from the previous stage with voltage swing $(0, 2^{k-2}V_{DD})$ drives the $clk_{in\_ak}$ and $clk_{in\_bk}$ nodes. Additionally, the charge pump cell generates a pair of complementary clock signals with voltage swing of $2^{k-1}V_{DD}$ to $2^kV_{DD}$ at $V_{o\_ak}$ and $V_{o\_bk}$, respectively. At the same time, another pair of complementary clock signals ($clk_{a\_k}$ and $clk_{b\_k}$) with voltage swing $(0, 2^{k-1}V_{DD})$ are generated, which form the inputs to the next stage.

When a pair of complementary clock signals with voltage swing between 0 to $V_{DD}$ are applied to the inputs of the first stage of the charge pump, the k-th unit cell, with $k\geq 2$, operates as follows, wherein the gate, drain and source voltages of the transistors in the single-cell doubler 500 during the time intervals P1 and P2 are as listed in Table I and II below, respectively.

TABLE 1

Unit cell transistor node voltages during time interval P1.

| Transistors | Gate Voltage | Drain Voltage | Source Voltage | ON/OFF | Type |
|---|---|---|---|---|---|
| $M_{ak1}$ | 0 | $2^{k-1}V_{DD}$ | $2^{k-1}V_{DD}$ | ON | PMOS |
| $M_{ak2}$ | 0 | $2^{k-1}V_{DD}$ | 0 | OFF | NMOS |
| $M_{ak3}$ | $2^kV_{DD}$ | $2^kV_{DD}$ | $2^{k-2}V_{DD}$ | OFF | PMOS |
| $M_{ak4}$ | $2^{k-2}V_{DD}$ | $2^kV_{DD}$ | $2^{k-1}V_{DD}$ | OFF | NMOS |
| $M_{ak5}$ | $2^{k-2}V_{DD}$ | $2^kV_{DD}$ | $2^kV_{DD}$ | ON | PMOS |

TABLE 2

Unit cell transistor node voltages during time interval P2.

| Transistors | Gate Voltage | Drain Voltage | Source Voltage | ON/OFF | Type |
|---|---|---|---|---|---|
| $M_{ak1}$ | $2^{k-2}V_{DD}$ | 0 | $2^{k-2}V_{DD}$ | OFF | PMOS |
| $M_{ak2}$ | $2^{k-2}V_{DD}$ | 0 | 0 | ON | NMOS |
| $M_{ak3}$ | $2^{k-2}V_{DD}$ | $2^{k-1}V_{DD}$ | $2^{k-1}V_{DD}$ | ON | PMOS |
| $M_{ak4}$ | $2^{k-1}V_{DD}$ | $2^{k-2}V_{DD}$ | $2^{k-2}V_{DD}$ | ON | NMOS |
| $M_{ak5}$ | $2^{k-1}V_{DD}$ | $2^{k-2}V_{DD}$ | $2^{k-1}V_{DD}$ | OFF | PMOS |

With reference first to single-cell doubler 502 of the k-th unit cell as illustrated by FIG. 5, operation can proceed as follows. During the time interval P2, $clk_{in\_ak}$ equals $2^{k-2}V_{DD}$, which turns on $M_{ak2}$ and turns off $M_{ak1}$. Thus, the voltage at $clk_{ak}$ is 0. At the same time, the voltage at $V_{in\_ak}$ is $2^{k-1}V_{DD}$, which turns on $M_{ak4}$ and turns off $M_{ak5}$ of the dynamic inverter. As a result, the gate voltage of $M_{ak3}$ equals the source voltage of $M_{ak4}$ ($=2^{k-2}V_{DD}$), which turns on $M_{ak3}$ to charge $C_{ak}$ to $2^{k-1}V_{DD}$. During the time interval P1, $clk_{in\_ak}$ equals 0, which turns on $M_{ak1}$ and turns off $M_{ak2}$. Therefore, $2^{k-1}V_{DD}$ is passed to the negative terminal of $C_{ak}$ (node $clk_{ak}$) and $2^{k-1}V_{DD}+2^{k-1}V_{DD}=2^kV_{DD}$ appears at the positive terminal of $C_{ak}$. At the same time, $V_{in\_ak}$ equals $2^{k-2}V_{DD}$, which turns on $M_{ak5}$ and turns off $M_{ak4}$ of the dynamic inverter. Therefore, the gate voltage of $M_{ak3}$ equals the voltage at the positive terminal of $C_{ak}$ ($=2^kV_{DD}$), which completely shuts down $M_{ak3}$.

Single-cell doubler 504 in the same stage has the same operation at the opposite phase of the clock signal. As a result, a pair of complementary switching signals with voltage swing $(2^{k-1}V_{DD}, 2^kV_{DD})$ appears at $V_{o\_ak}$ and $V_{o\_bk}$, respectively. These two nodes are respectively connected to $V_{in\_b(k+1)}$ and $V_{in\_a(k+1)}$ of the next stage. At the same time, the complementary switching signals at $clk_{ak}$ and $clk_{bk}$ with voltage swing (0, $2^{k-1}V_{DD}$) are connected to $clk_{in\_b(k+1)}$ and $clk_{in\_a(k+1)}$ of the (k+1)-th stage. In one example, the substrates of the respective PMOS transistors are connected to the higher potential node between their respective source and drain to prevent forward biasing of PN junctions in the device. It can be appreciated that when the transistors are turned off in the charge pump illustrated by FIGS. 5-6, the gate voltages of the NMOS transistors are smaller than or equal to their respective drain and source voltages. At the same time, the gate voltages of the PMOS transistors are higher than or equal to their respective drain and the source voltages. In the case when the transistors are turned on, the gate to source voltages of the NMOS transistors and the source to gate voltages of the PMOS transistors are at least larger than $V_{DD}$. As a result, all of the power transistors used in the voltage doubler circuits illustrated by FIGS. 5-6 can be implemented with standard high voltage CMOS process. Accordingly, significant complexity and cost savings are achieved as compared to conventional charge pump circuits, such as that illustrated by FIG. 4, where 4 out of 6 power transistors are required to be implemented with a triple well process. Additionally, it can be appreciated that the sizes of the transistors used to implement the dynamic inverters in the unit cell 500 are small when compared to that of the power transistors, since the dynamic inverters in the unit cell 500 are used to drive the gate capacitances of $M_{ak3}$ and $M_{bk3}$ only.

In an embodiment, the cross-coupled doubler unit cell 500 can be cascaded to generate a higher conversion ratio, as shown by charge pump circuit 600 in FIG. 6. As shown in FIG. 6, the clock signals $V_{in\_ak}$, $V_{in\_bk}$, $clk_{in\_ak}$, $clk_{in\_bk}$ of a given cascaded cell can be connected to $V_{o\_b(k-1)}$, $V_{o\_a(k-1)}$, $clk_{b(k-1)}$, and $clk_{a(k-1)}$ of the previous unit cell, respectively. In one example, two PMOS power transistors are connected to the output of the last cascaded unit cell to transfer the charge to the output capacitor in both clock phases. As further shown in FIG. 6, the first unit cell has the same structure and operation as that shown in FIG. 5, except that the charge transfer transistors, $M_{a11}$, $M_{b11}$, $M_{a13}$ and $M_{b13}$, are charged by the supply voltage instead of the clock signals. As a result, a $2^n \times$ voltage conversion charge pump can be obtained by cascading n charge pump cells with two additional small size PMOS transistors to form the output stage. Accordingly, it can be appreciated that one embodiment of charge pump circuit 600 utilizes a total of 2n NMOS power transistors, 4n+2 PMOS power transistors and 2n+1 capacitors.

Figure 8:
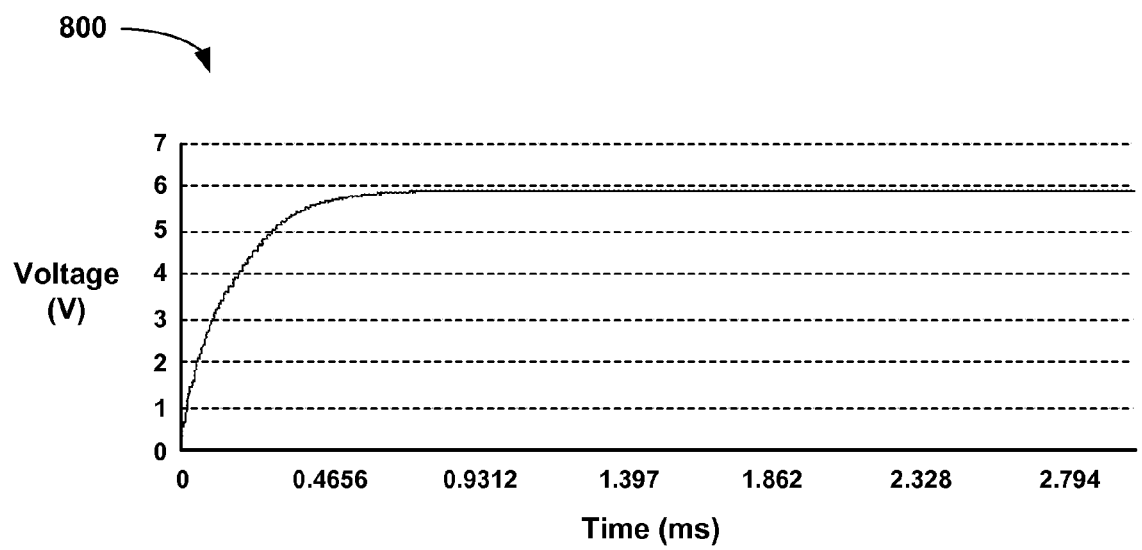
FIG. 8 illustrates output voltage at a loading capacitor for an example 4× voltage conversion charge pump in accordance with various aspects.

Referring next to FIG. 8, a diagram 800 is provided that illustrates simulated performance data for an example 4x voltage conversion charge pump constructed in accordance with various aspects described herein. The simulation utilizes a clock frequency of 100 kHz with 2 ns transition, a supply voltage of 1.5V, and a 100 nF, 1Ω, equivalent series resistance (ESR) loading capacitor $C_L$ with zero initial charge. As shown by diagram 800, the final output voltage reaches 5.95 V under a loading current of 99 µA, which is substantially close to the ideal output and illustrates that the leakage or reverse current in the charge pump is small. The simulated power efficiency, which is given by the power consumed by the loading resistor divided by the total supplied power, equals 94.98%. The power of the clock signal is not included in the preceding calculation.

Figure 9:
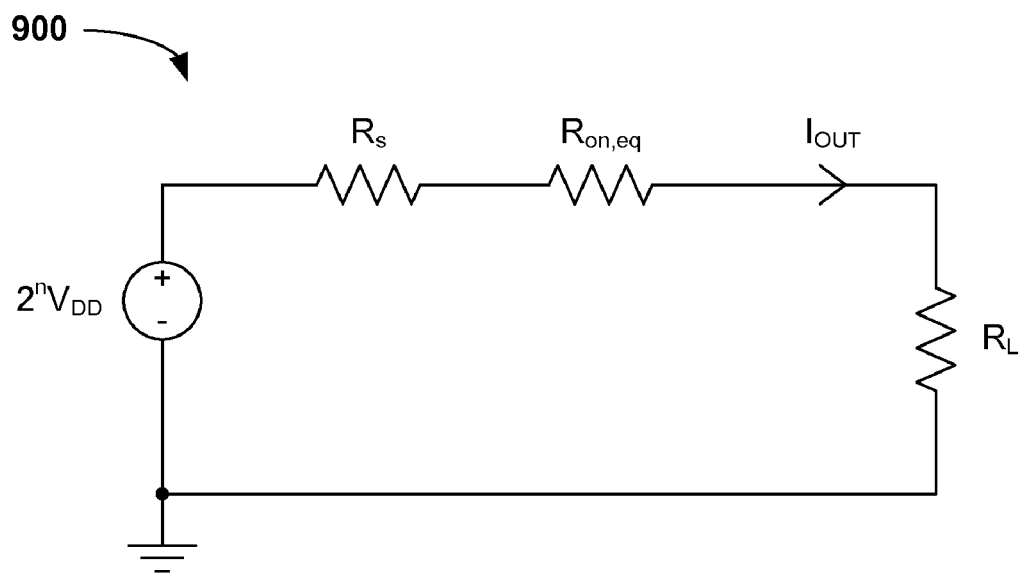
FIG. 9 illustrates an equivalent circuit of an example switched capacitor charge pump circuit in accordance with various aspects.

In accordance with further embodiments, discussion of various aspects of the charge pump designs described herein follows. With reference first to output voltage, the equivalent circuit 900 of the proposed voltage converter as illustrated in FIG. 9 can be considered, with the assumption that all the capacitors of the charge pump are the same and that the on-resistance of the power transistors are the same. The duty cycle of the two opposite clock signals are 50%. Further, the loss caused by the source resistance $R_s$ of the charge pump is inversely proportional to the clock frequency and the capacitance:

$$R_s = \frac{k'}{fC}, \qquad (1)$$

where C is the total capacitance of the flying and loading capacitors, f is the clock frequency and k' is a proportional constant which depends on the configuration of the charge pump and increases with the number of stages.

In one example, the loss due to the on-resistance of the power switches, $R_{on,eq}$, in the charging and discharging paths of the charge pump is directly proportional to the number of the power switches used, which in turn depends on the number of stage of the charge pump:

$$R_{on,eq} = k'' R_{on}, \qquad (2)$$

where $R_{on}$ is the on-resistance of the power switches and k'' is a proportional constant which depends on the configuration of the charge pump and increases with the number of stages. Hence, the voltage drop of the charge pump is given by $$2^n V_{DD} - V_{OUT} = I_{OUT}\left(\frac{k'}{fC} + k'' R_{on}\right). \qquad (3)$$

Accordingly, it can be appreciated that the voltage drop increases linearly with the loading current. Moreover, the voltage drop increases with decreasing operation frequency due to the increases of the source resistance in Equation (1). Further, the voltage drop increases with the number of cascaded stages, as indicated by k' and k'' in Equation (3).

With reference next to power efficiency, it can be appreciated that the power loss of the charge pump is caused by both the conduction loss (denoted by $P_C$) and the switching loss (denoted by $P_S$). The conduction loss accounts for the power dissipated by the on-resistance of the power switches in the charging and discharging paths. The switching loss is incurred by charging and discharging the parasitic capacitors at various circuit nodes. The power efficiency η of the charge pump is defined as the ratio between the power delivered to the load $P_L$, and the total power consumed by the charge pump and the load:

$$\eta = \frac{P_L}{P_L + P_C + P_S} \times 100. \qquad (4)$$

The conduction loss of the charge pump is given by $$P_C = I_{OUT}^2(R_s + R_{on,eq}) = I_{OUT}^2\left(\frac{k'}{fC} + k'' R_{on}\right). \qquad (5)$$

Assuming that the total parasitic capacitance at node a in the charge pump equals $C_{p,a}$ and the node voltage swings between $m_{a1}V_{DD}$ and $m_{a2}V_{DD}$ at the two clock phases, the switching loss $P_a$ due to the parasitic capacitance at node a equals $$P_a = C_{p,a}(m_{a1} - m_{a2})^2 V_{DD}^2 f = \hat{m}_a V_{DD}^2 f, \qquad (6)$$

where $\hat{m}_a$ equals the summation of the products of the parasitic capacitance and the squares of the voltage swing at node a.

The total switching loss of the charge pump equals the sum of the switching loss at various nodes. Therefore, the total switching loss is given by $$P_S = \sum_a \hat{m}_a V_{DD}^2 f. \qquad (7)$$

Further, the power consumed by the loading resistor is given by $$P_L = I_{OUT} 2^n V_{DD} - I_{OUT}^2 \left( \frac{k'}{fC} + k'' R_{on} \right). \qquad (8)$$

As a result, the power efficiency can be obtained by substituting Equations (5), (7) and (8) into Equation (4):

$$\eta = \frac{I_{OUT} 2^n V_{DD} - I_{OUT}^2 \left( \frac{k'}{fC} + k'' R_{on} \right)}{I_{OUT} 2^n V_{DD} + m'(V_{DD})^2 f} \times 100. \qquad (9)$$

The power efficiency increases at a small loading current, which can be explained by Equations (4) and (9). When the loading current is closed to 0, the switching loss $P_S$ of the charge pump in Equation (4) is large while the conduction loss $P_C$ and the power consumed by the loading $P_L$ are small because of the small loading current. Therefore, the power efficiency is closed to 0%. As the loading current increases from 0, $P_L$ becomes more and more significant. Hence, the efficiency increases and ultimately reaches the maximum efficiency of the charge pump. It can also be observed that the power efficiency is low when the circuit operates at a high clock frequency with a small loading current, since the switching loss of the charge pump is directly proportional to the operation frequency. It can further be observed that the power efficiency decreases when the loading current is larger than 150 µA, since the conduction loss $P_C$ becomes significant as the loading current increases. In addition, it can be observed that low power efficiency at a low clock frequency and a large loading current can occur due to the increasing output resistance of the charge pump with decreasing operation frequency. The large output resistance increases the conduction loss of the charge pump, as indicated in Equation (5).

With reference next to output voltage ripple, when the loading capacitor $C_L$ is charged for half of the clock period, the output voltage ripple $V_{ripple}$ is given by $$V_{ripple} = \frac{I_{OUT}}{2fC_L}. \qquad (10)$$

Due to the cross-coupled structure of the charge pump, the loading capacitor of the charge pump is charged for the whole clock period, and has an effective operation frequency of 2f. Accordingly, the output voltage ripple is half of that given by Equation (10), or more particularly, $$V_{ripple} = \frac{I_{OUT}}{4fC_L}. \qquad (11)$$

Referring next to voltage conversion ratio with different supply voltages, variation of the voltage conversion ratio with supply voltage is caused by the variation of $R_{on}$ the power switches in Equation (3) under different supply voltages. When the power switch is turned on, it operates in the linear region and its on-resistance is given by $$R_{on} = \frac{L}{\mu C_{ox} W(|V_{gs}| - |V_t|)}, \qquad (12)$$

where $\mu$ is the carrier mobility, $C_{ox}$ is the capacitance per unit area of the gate oxide, W and L are the channel width and length of the power transistor, $V_t$ is the threshold voltage and $V_{gs}$ is the gate to source voltage of the transistor. Since the $V_{gs}$ of the proposed charge pump linearly depends on $V_{DD}$, $R_{on}$ inversely depends on the supply voltage. As a result, the conversion ratio decreases with decreasing $V_{DD}$ because of the increasing voltage drop, as indicated by Equation (3).

With regard to power efficiency with different supply voltages, since the power efficiency is low at high clock frequencies, it can be concluded that the switching loss is the dominant factor at a 100 µA loading current. In one example, de-creasing power efficiency with increasing supply voltage is caused by the increasing switching loss, which is proportional to $V_{DD}$ as derived in Equation (7). On the other hand, the power efficiency also decreases in the low supply voltage range, which is caused by the increase in $R_{on}$ of the power transistors at low supply voltage, as described in Equation (9). However, the switching loss is the dominant loss factor at the measured loading current, and as a result the decrease in power efficiency caused by the increased $R_{on}$ at low supply voltage is observed to be small.

In an aspect, the high output voltage conversion ratio, high power efficiency and small output voltage ripple of the charge pump designs provided herein demonstrates the effectiveness and small reverse current of the charge pump structure as described herein. Compared with conventional circuits, no trimming on the threshold voltages of the power transistors is needed, and the entire circuit can be fabricated by ordinary high voltage n-well process. The number of power transistors required in each stage is the same as that in conventional circuits, with the extra four small transistors utilized for the dynamic inverters in the proposed unit cell. However, as noted above, some transistors in conventional charge pump circuits are required to be implemented with a triple well process, which requires significant silicon area when compared to that required by the power transistors implemented with the high voltage n-well process in the circuit designs provided herein. As a result, it can be concluded that the required silicon area of the charge pump designs described herein is at least comparable if not smaller than that of conventional charge pump circuits. Accordingly, it can be appreciated that the charge pump circuits herein provide area efficiency in addition to the other above-described benefits.

In various embodiments described herein, a systematic method for designing a two-phase $2^n \times$ voltage conversion switched capacitor charge pump is described. The $2^n \times$ voltage conversion is obtained by cascading n cross-coupled doubler cells, where the boosting elements are implemented by dynamic circuits that provide level shifting without the need for different threshold voltage MOSFETs. The proposed direct current (DC)-DC converter has a regular structure, which simplifies the circuit design and layout.

Figure 10:
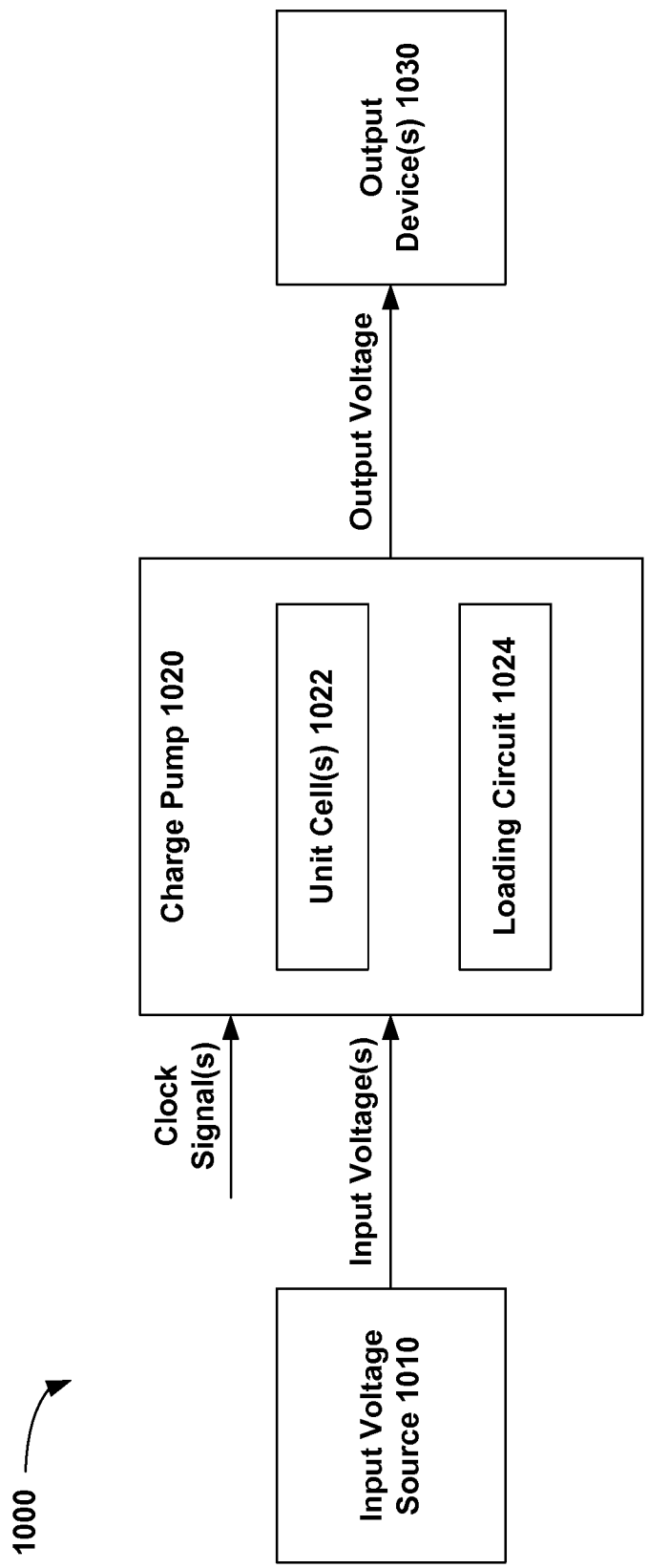
FIG. 10 is a block diagram of a voltage conversion system in accordance with various aspects.

Turning to FIG. 10, is a block diagram of a voltage conversion system 1000 is illustrated in accordance with various aspects. System 1000 includes an input voltage source 1010, which provides one or more input voltage signals to a charge pump 1020. Charge pump 1020 is designed in accordance with one or more aspects herein, and includes one or more cascaded unit cells 1022 and a loading circuit 1024 to convert the input voltage signal(s) to an output voltage signal based on one or more clock signals. The output voltage signal is then provided to one or more output devices 1030. In an aspect, output device(s) 1030 can be associated with, e.g., an LCD driver, a memory device, an LED driver, a PDA and/or other computing device, etc.

Referring now to FIGS. 11-14, example methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 11:
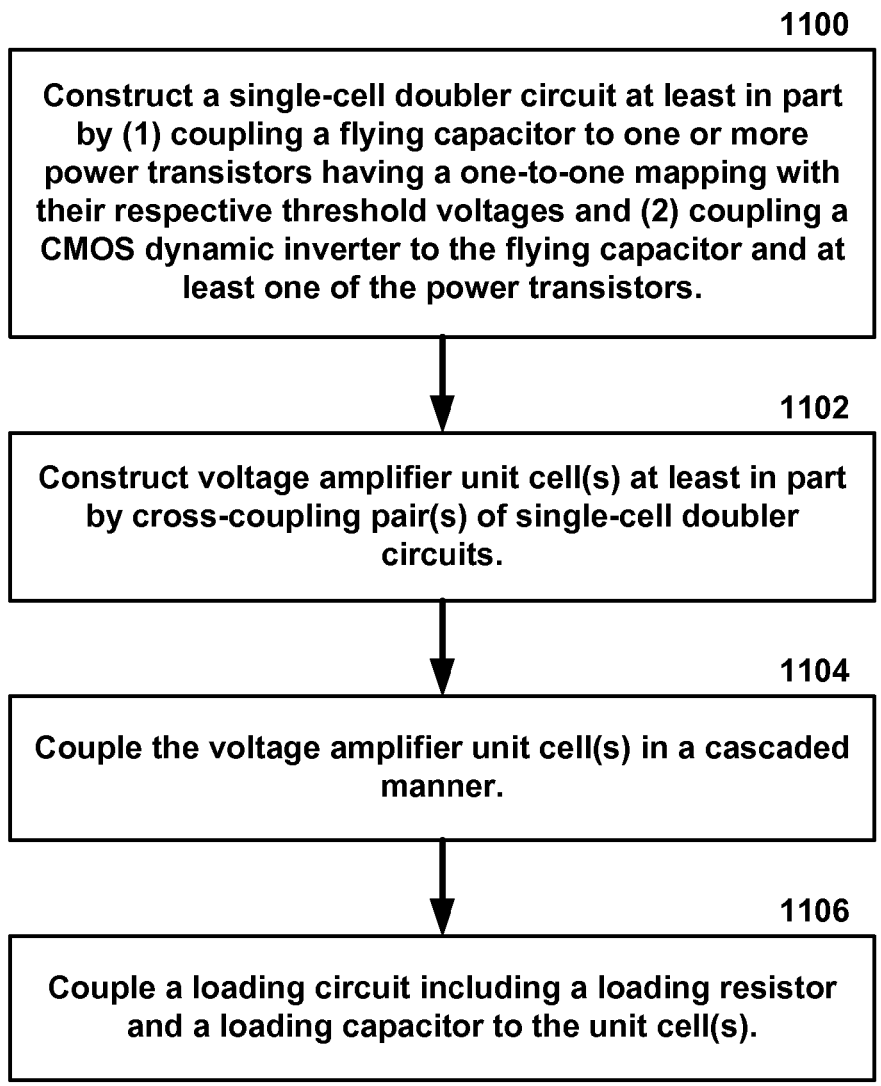
FIG. 11 is a flow diagram of a method for constructing an exponential voltage conversion charge pump circuit in accordance with various aspects.

With reference to FIG. 11, a methodology for constructing an exponential voltage conversion charge pump circuit in accordance with various aspects is illustrated. At 1100, a single-cell doubler circuit is constructed at least in part by (1) coupling a flying capacitor to one or more power transistors having a one-to-one mapping with their respective threshold voltages (e.g., such that none of the power transistors operate according to multiple threshold voltages) and (2) coupling a CMOS dynamic inverter to the flying capacitor and at least one of the power transistors. At 1102, voltage level shifting unit cell(s) are constructed at least in part by cross-coupling pair(s) of single-cell doubler circuits. At 1104, the voltage level shifting unit cell(s) are coupled in a cascaded manner. At 1106, a loading circuit including a loading resistor and a loading capacitor is coupled to the unit cell(s).

Figure 12:
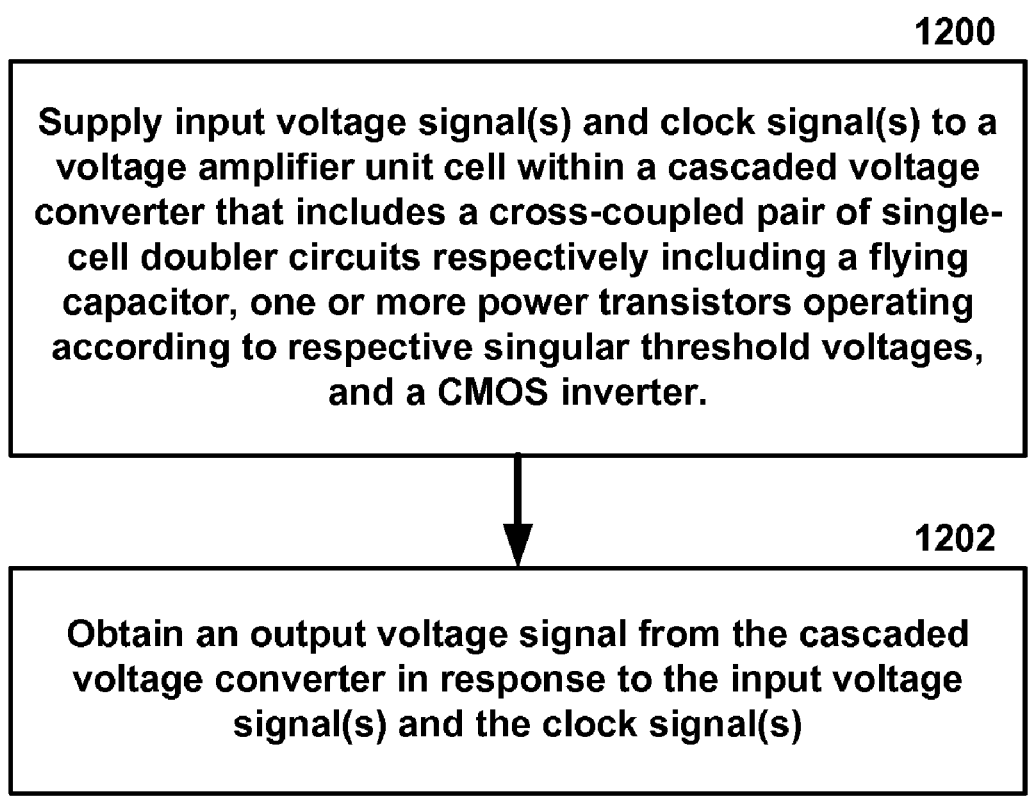
FIGS. 12-14 are flow diagrams of respective example operating methods for an exponential voltage conversion charge pump circuit in accordance with various aspects.

Turning to FIG. 12, a methodology for operating an exponential voltage conversion charge pump circuit in accordance with various aspects is illustrated. At 1200, input voltage signal(s) and clock signal(s) are supplied to a voltage level shifting unit cell within a cascaded voltage converter (e.g., including one or more voltage level shifting unit cells coupled in cascade). The voltage level shifting unit cell includes a cross-coupled pair of single-cell doubler circuits, which respectively include a flying capacitor, one or more power transistors operating according to respective singular threshold voltages, and a CMOS inverter. At 1202, an output voltage signal is obtained from the cascaded voltage converter in response to the input voltage signal(s) and the clock signal(s).

Figure 13:
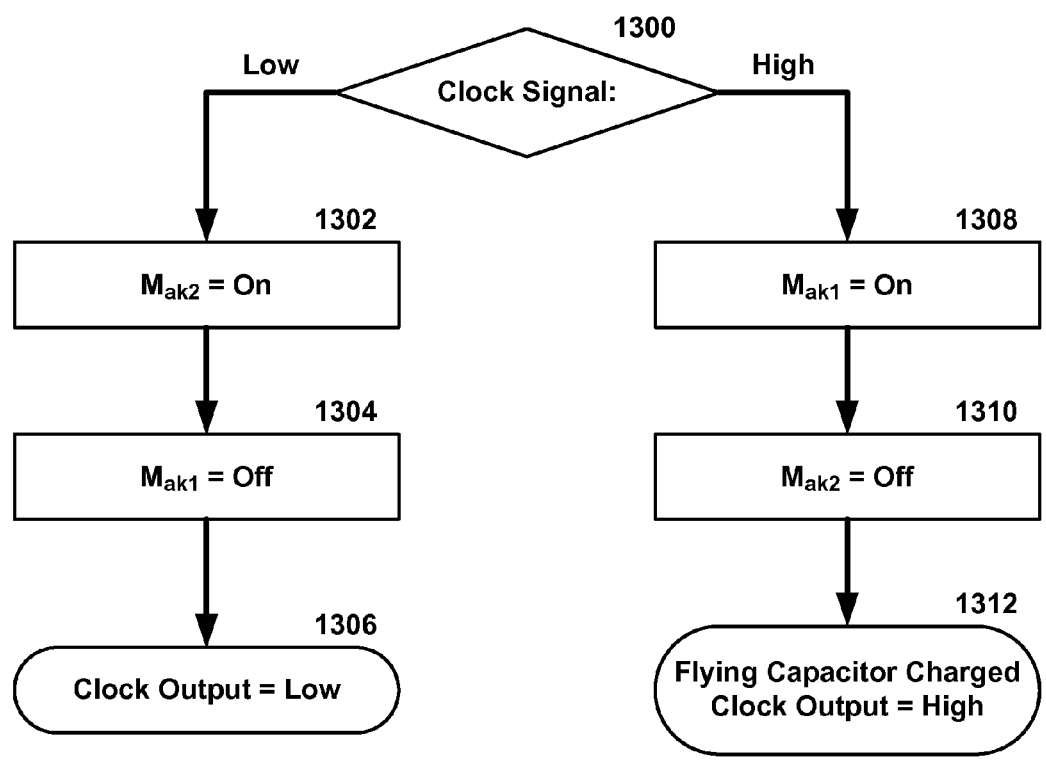

Referring next to FIG. 13, a first example operating method for an exponential voltage conversion charge pump circuit is illustrated in accordance with various aspects. While the notation in FIG. 13 refers to unit cell 500 in FIG. 5, it should be appreciated that operation of any suitable charge pump circuit design constructed as generally described herein can proceed as generally illustrated by the methodology of FIG. 13. At 1300, the methodology branches according to a clock signal. Thus, if the clock signal is low, the methodology proceeds to 1302, where transistor $M_{ak2}$ is activated, and to 1304, where transistor $M_{ak1}$ is deactivated. Accordingly, at 1306, a low clock output is obtained. Alternatively, if clock signal is high, the methodology proceeds to 1308, where transistor $M_{ak1}$ is activated, and to 1310, where transistor $M_{ak2}$ is deactivated. Accordingly, at 1312, the flying capacitor is charged and a high clock output is obtained.

Figure 14:
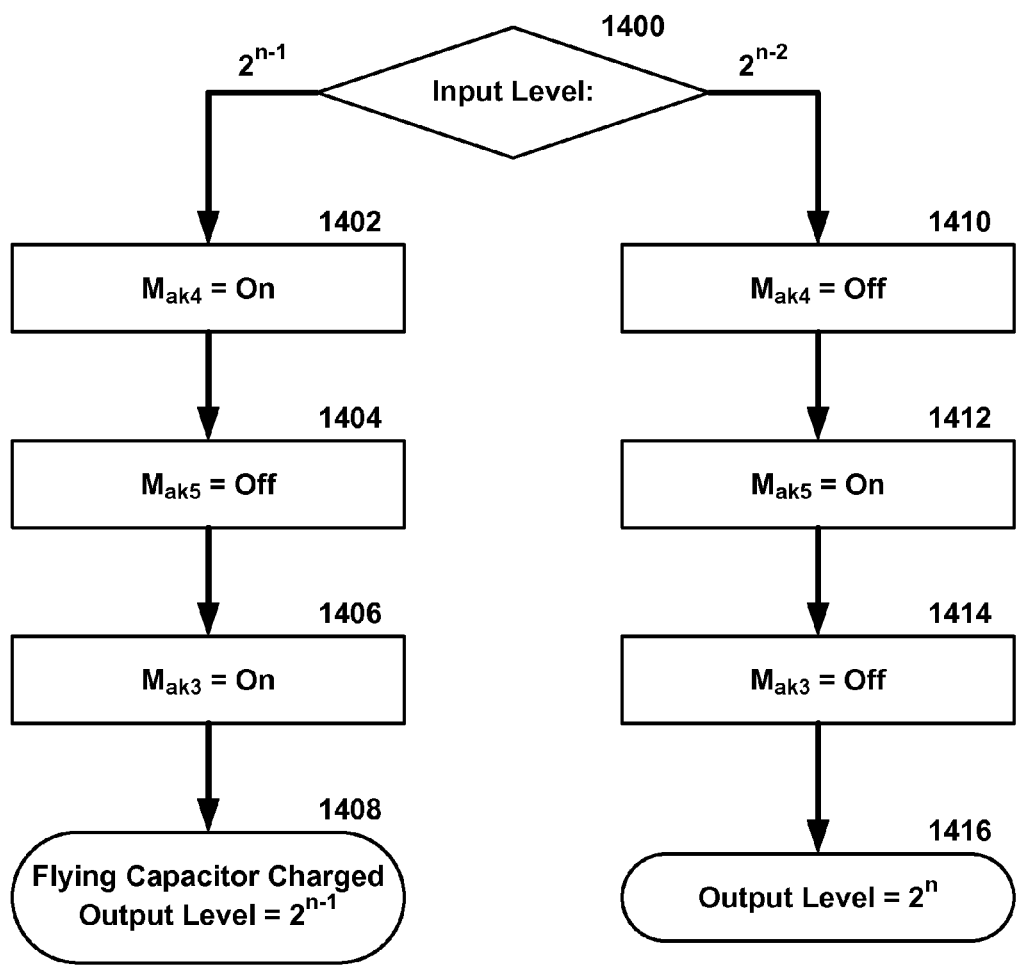

FIG. 14 illustrates a second example operating method for an exponential voltage conversion charge pump circuit in accordance with various aspects. While the notation in FIG. 14 refers to unit cell 500 in FIG. 5, it should be appreciated that operation of any suitable charge pump circuit design constructed as generally described herein can proceed as generally illustrated by the methodology of FIG. 14. At 1400, the methodology branches according to an input level. For example, if the input level is high (e.g., the input level equals $2^{n-1}$ for stage n), the methodology proceeds to 1402, where transistor $M_{ak4}$ is activated, to 1404, where transistor $M_{ak5}$ is deactivated, and to 1406, where transistor $M_{ak3}$ is activated. Accordingly, at 1408, the flying capacitor is charged and an output level of $2^{n-1}$ is obtained. Alternatively, if the input level is low (e.g., the input level equals $2^{n-2}$ for stage n), the methodology proceeds to 1410, where transistor $M_{ak4}$ is deactivated, to 1412, where transistor $M_{ak5}$ is activated, and to 1414, where transistor $M_{ak3}$ is deactivated. Accordingly, at 1416, an output level of $2^n$ is obtained.

What has been described above includes examples of systems and methods that provide advantages of the disclosed subject matter. It is, of course, not possible to describe every conceivable combination of components or methodologies for purposes of describing the disclosed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:
1. A charge pump, comprising:
one or more uniform unit cells, the one or more uniform unit cells respectively comprising:
two cross-coupled single-cell doubler circuits respectively comprising a flying capacitor, a set of power transistors coupled to the flying capacitor, and a dynamic inverter coupled to the flying capacitor and a power transistor of the set of power transistors,
wherein, for a single-cell doubler circuit of the two cross-coupled single-cell doubler circuits, the dynamic inverter includes at least a first inverter transistor and a second inverter transistor that are directly coupled to a gate of the power transistor to facilitate control of a switching state of the power transistor based at least in part on an input voltage signal of the single-cell doubler circuit that is supplied to respective gates of the first inverter transistor and the second inverter transistor,
wherein the two cross-coupled single-cell doubler circuits are configured to operate on respective input voltage signals, comprising the input voltage signal, according to respective clock signals to produce respective output voltage signals, and
wherein the set of power transistors operate according to respective singular threshold voltages; and a loading circuit configured to operate on respective output voltages of the one or more uniform unit cells to generate an output voltage of the charge pump.

2. The charge pump of claim 1, wherein the set of power transistors are constructed according to at least one of a n-well complementary metal-oxide-semiconductor (CMOS) process or a p-well CMOS process.

3. The charge pump of claim 1, wherein the dynamic inverter is implemented with a n-well complementary metal-oxide-semiconductor (CMOS) processor a p-well CMOS process, and the dynamic inverter is further implemented with at least one of an n-channel metal-oxide-semiconductor (NMOS) transistor or a p-channel metal-oxide-semiconductor (PMOS) transistor.

4. The charge pump of claim 1, wherein the two cross-coupled single-cell doubler circuits include the single-cell doubler circuit and a complementary single-cell doubler circuit, the set of power transistors includes a first power transistor, a second power transistor, and a third power transistor, and the power transistor is the third power transistor, and for the single-cell doubler circuit:
   a clock signal is provided to respective gates of the first power transistor and the second power transistor, an input signal from the complementary single-cell doubler circuit is provided to a source of the first power transistor, and respective drains of the first power transistor and the second power transistor are coupled to a negative terminal of the flying capacitor,
   a drain of the third power transistor is coupled to a positive terminal of the flying capacitor and the input signal of the single-cell doubler circuit is provided to a source of the third power transistor, and
   respective drains of the first inverter transistor and the second inverter transistor are coupled to a gate of the third power transistor, the input signal from the complementary single-cell doubler circuit is provided to a source of the first inverter transistor, and a source of the second inverter transistor is coupled to the positive terminal of the flying capacitor.

5. The charge pump of claim 4, wherein the single-cell doubler circuit further comprises:
   a clock signal output terminal coupled to the respective drains of the first power transistor and the second power transistor; and
   a voltage signal output terminal coupled to the positive terminal of the flying capacitor.

6. The charge pump of claim 5, wherein the clock signal and the input signal of the single-cell doubler circuit oscillate between a high state and a low state.

7. The charge pump of claim 6, wherein the single-cell doubler circuit is configured to activate the second power transistor and deactivate the first power transistor in response to the clock signal of the single-cell doubler circuit operating in the high state, thereby causing the clock signal output terminal to output a signal operating in the low state.

8. The charge pump of claim 6, wherein the single-cell doubler circuit is configured to activate the first inverter transistor, deactivate the second inverter transistor, and activate the third power transistor in response to the input signal of the single-cell doubler circuit operating in the high state, thereby charging the flying capacitor and causing the voltage signal output terminal to output an output signal with an output voltage substantially equal or equal to the input signal of the single-cell doubler circuit.

9. The charge pump of claim 6, wherein the single-cell doubler circuit is configured to activate the first power transistor and deactivate the second power transistor in response to the clock signal of the single-cell doubler circuit operating in the low state, thereby charging the flying capacitor and causing the clock signal output terminal to output a signal operating in the high state.

10. The charge pump of claim 6, wherein the single-cell doubler circuit is configured to deactivate the first inverter transistor, activate the second inverter transistor, and deactivate the third power transistor in response to the input signal of the single-cell doubler circuit operating in the low state, thereby causing the voltage signal output terminal to output an output signal with a higher voltage than the input signal of the single-cell doubler circuit.

11. The charge pump of claim 6, wherein the second power transistor and the first inverter transistor in the single-cell doubler circuit are n-channel metal-oxide-semiconductor (NMOS) transistors.

12. The charge pump of claim 6, wherein the first power transistor, the third power transistor, and the second inverter transistor in the single-cell doubler circuit are p-channel metal-oxide-semiconductor (PMOS) transistors.

13. The charge pump of claim 12, wherein respective substrates of the PMOS transistors are connected to respective nodes of highest potential of the PMOS transistors between respective sources of the PMOS transistors and respective drains of the PMOS transistors.

14. The charge pump of claim 1, wherein a clock signal provided to a complementary single-cell doubler circuit of the two cross-coupled single-cell doubler circuits is complementary to a clock signal provided to the single-cell doubler circuit of the two cross-coupled single-cell doubler circuits.

15. The charge pump of claim 1, wherein a common input voltage signal is provided to the two cross-coupled single-cell doubler circuits of an initial unit cell of the one or more uniform unit cells.

16. A method for constructing a charge pump, comprising:
   constructing a single-cell doubler circuit at least in part by coupling a flying capacitor to a power transistor of a set of power transistors and coupling a complementary metal-oxide-semiconductor (CMOS) dynamic inverter to the flying capacitor and the power transistor of the set of power transistors, wherein respective power transistors of the set of power transistors operate according to respective threshold voltages based on a one-to-one mapping between the respective power transistors of the set of power transistors and the respective threshold voltages;
   constructing the complementary CMOS dynamic inverter comprising a first inverter transistor and a second inverter transistor at least in part by:
      connecting an input signal for the single-cell doubler circuit to respective gate inputs of the first inverter transistor and the second inverter transistor to facilitate controlling a switching state of the power transistor based at least in part on the input signal of the single-cell doubler circuit, and
      directly coupling the first inverter transistor and the second inverter transistor to a gate input of the power transistor;
   constructing at least one voltage level shifting unit cell at least in part by cross-coupling at least one corresponding pair of single-cell doubler circuits comprising the single-cell doubler circuit;
   coupling the at least one voltage level shifting unit cell in a cascaded manner; and
   coupling a loading circuit comprising a loading resistor and a loading capacitor to the at least one voltage level shifting unit cell.

17. The method of claim 16, further comprising:
constructing the set of power transistors according to at least one of a n-well CMOS process or a p-well CMOS process.

18. The method of claim 16, wherein the constructing a single-cell doubler circuit further comprises:
connecting a clock signal source to respective gate inputs of a first power transistor and a second power transistor, wherein the set of transistors comprises the first power transistor, the second power transistor, and a third power transistor, and the power transistor is the third power transistor;
connecting an input signal corresponding to a complementary single-cell doubler circuit to a source input of the first power transistor, wherein the at least one corresponding pair of single-cell doubler circuits further includes the complementary single-cell doubler circuit;
coupling respective drain inputs of the first power transistor and the second power transistor to a negative terminal of the flying capacitor;
coupling a positive terminal of the flying capacitor to a drain input of the third power transistor; and
connecting the input signal for the single-cell doubler circuit to a source input of the third power transistor wherein
the constructing the CMOS dynamic inverter further comprises:
coupling respective drain inputs of the first inverter transistor and the second inverter transistor to the gate input of the third power transistor,
connecting the input signal corresponding to the complementary single-cell doubler circuit to a source input of the first inverter transistor, and
coupling a source input of the second inverter transistor to the positive terminal of the flying capacitor.

19. The method of claim 18, further comprising:
configuring the single-cell doubler circuit to activate the second power transistor and to deactivate the first power transistor in response to a high state of a clock signal for the single-cell doubler circuit, thereby causing the single-cell doubler circuit to output a clock signal in a low state; and
configuring the single-cell doubler circuit to activate the first inverter transistor, deactivate the second inverter transistor, and activate the third power transistor, in response to a high state of an input voltage signal for the single-cell doubler circuit, thereby charging the flying capacitor and causing the single-cell doubler circuit to output an output signal substantially equal or equal to the input signal for the single-cell doubler circuit.

20. The method of claim 18, further comprising:
configuring the single-cell doubler circuit to activate the first power transistor and to deactivate the second power transistor in response to a low state of a clock signal for the single-cell doubler circuit, thereby charging the flying capacitor and causing the single-cell doubler circuit to output a clock signal in a high state; and
configuring the single-cell doubler circuit to deactivate the first inverter transistor, activate the second inverter transistor, and deactivate the third power transistor, in response to a low state of an input voltage signal for the single-cell doubler circuit, thereby causing the single-cell doubler circuit to output a voltage higher than the input voltage of the single-cell doubler circuit.

21. A method for operating a charge pump, comprising:
supplying at least one input voltage signal and at least one clock signal to a voltage level shifting unit cell that includes a cross-coupled pair of corresponding single-cell doubler circuits comprising a single-cell doubler circuit and a second single-cell doubler circuit that are cross-coupled to each other, the first single-cell doubler circuit and the second single-cell doubler circuit respectively including a flying capacitor coupled to a power transistor of a set of power transistors and a complementary metal-oxide-semiconductor (CMOS) dynamic inverter coupled to the flying capacitor and the power transistor of the set of power transistors,
wherein, for the first single-cell doubler circuit, the CMOS dynamic inverter includes at least a first inverter transistor and a second inverter transistor that are directly coupled to a gate of the power transistor to facilitate controlling a switching state of the power transistor based at least in part on the at least one input voltage signal that is supplied to respective gates of the first inverter transistor and the second inverter transistor; and
obtaining an output voltage signal from the voltage level shifting unit cell in response to the at least one input voltage signal and the at least one clock signal.

22. The method of claim 21, further comprising:
obtaining a clock output signal in a low state from the first single-cell doubler circuit in response to supplying the at least one clock signal in a high state to the first single-cell doubler circuit; and
obtaining an output voltage equal to a voltage of the input voltage signal from the first single-cell doubler circuit in response to supplying the at least one input voltage signal in a high state to the first single-cell doubler circuit.

23. The method of claim 21, further comprising:
obtaining a clock output signal in a high state from the first single-cell doubler circuit in response to supplying the at least one clock signal in a low state to the first single-cell doubler circuit; and
obtaining the output voltage signal that is higher than a voltage of the at least one input voltage signal from the first single-cell doubler circuit in response to supplying the at least one input voltage signal in a low state to the first single-cell doubler circuit.

24. A system, comprising:
an input voltage source;
one or more output devices;
a charge pump connecting the input voltage source to the one or more output devices configured to level shift a voltage of a signal corresponding to the input voltage source, wherein the charge pump comprises:
one or more uniform unit cells, the one or more uniform unit cells respectively comprising:
two cross-coupled single-cell doubler circuits respectively comprising a flying capacitor, a set of power transistors comprising a power transistor coupled to the flying capacitor, and a complementary metal-oxide-semiconductor (CMOS) dynamic inverter coupled to the flying capacitor and the power transistor of the set of power transistors,
wherein the cross-coupled single-cell doubler circuits are configured to operate on respective input voltage signals according to respective clock signals to produce respective output voltage signals,
wherein the set of power transistors of the two cross-coupled single-cell doubler circuits operate according to respective solitary threshold voltages,
wherein, for a cross-coupled single-cell doubler circuit of the two cross-coupled single-cell doubler circuits, the CMOS dynamic inverter includes at least a first inverter transistor and a second inverter transistor that are directly coupled to a gate of the power transistor to facilitate control of a switching state of the power transistor based at least in part on an input voltage signal associated with the single-cell doubler circuit that is supplied to respective gates of the first inverter transistor and the second inverter transistor, and the respective input voltage signals comprise the input voltage signal associated with the single-cell doubler circuit; and a loading circuit configured to operate on respective output voltages of the one or more uniform unit cells to generate an output voltage of the charge pump.

25. The system of claim 24, wherein the one or more output devices comprise at least one of a liquid crystal display (LCD) driver, a memory device, a light-emitting diode (LED) driver, or a personal digital assistant (PDA).

26. A voltage conversion system, comprising:

means for supplying an input voltage and at least one clock signal;

means for converting the input voltage to a level shifted output voltage according to the at least one clock signal, wherein the means for converting is implemented at least in part using power transistors of a set of power transistors having respective singular threshold voltages;

means for cross-coupling a single-cell doubler circuit and a complementary single-cell doubler circuit to facilitate converting the input voltage to the level shifted output voltage, wherein the single-cell doubler circuit and the complementary single-cell doubler circuit respectively include a flying capacitor, a dynamic inverter, and the set of power transistors, and, for the single-cell doubler circuit, the dynamic inverter includes at least a first inverter transistor and a second inverter transistor that are directly coupled to a gate of a power transistor of the set of power transistors to facilitate controlling a switching state of the power transistor based at least in part on an input signal for the single-cell doubler circuit that is supplied to respective gates of the first inverter transistor and the second inverter transistor; and means for providing an output signal with a higher voltage than the input voltage to one or more output devices.

* * * * *